US012580470B2

(12) United States Patent
Kung et al.

(10) Patent No.: US 12,580,470 B2
(45) Date of Patent: Mar. 17, 2026

(54) DETECTOR CIRCUIT HAVING CURRENT CONVERSION MECHANISM FOR POWER CONVERTER

(71) Applicant: ANPEC ELECTRONICS CORPORATION, Hsinchu (TW)

(72) Inventors: Hsuan-Li Kung, Hsinchu City (TW); Chih-Ning Chen, Taipei City (TW); Chih-Heng Su, Hsinchu City (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 239 days.

(21) Appl. No.: 18/626,437

(22) Filed: Apr. 4, 2024

(65) Prior Publication Data

US 2025/0253754 A1     Aug. 7, 2025

(30) Foreign Application Priority Data

Feb. 6, 2024     (TW) .................................. 113104613

(51) Int. Cl.
*H02M 1/32* (2007.01)
*H02M 1/00* (2006.01)
(52) U.S. Cl.
CPC ........... *H02M 1/0009* (2021.05); *H02M 1/32* (2013.01)

(58) Field of Classification Search
CPC .............................. H02M 1/0009; H02M 1/32
See application file for complete search history.

(56) References Cited

U.S. PATENT DOCUMENTS

| | | | |
|---|---|---|---|
| 10,770,973 B1 * | 9/2020 | Chen ........................ | H02M 1/08 |
| 11,515,791 B2 * | 11/2022 | Hsu ..................... | H02M 1/0009 |
| 12,451,799 B2 * | 10/2025 | Chen ................... | H02M 1/0009 |
| 2025/0149983 A1 * | 5/2025 | Scaduto .................. | H02M 3/01 |

FOREIGN PATENT DOCUMENTS

| | | |
|---|---|---|
| TW | 201639286 A | 11/2016 |
| TW | 201902102 A | 1/2019 |

* cited by examiner

*Primary Examiner* — Adolf D Berhane
(74) *Attorney, Agent, or Firm* — Li & Cai Intellectual Property (USA) Office

(57) ABSTRACT

A detector circuit having a current conversion mechanism for a power converter is provided. An output terminal of the power converter is connected to a first terminal of an inductor. The detector circuit detects a current flowing through the inductor as a detected current, and converts the detected current into a detected voltage. The detector circuit compares the detected voltage with a reference voltage to generate a comparison signal. Each time when a level of the comparison signal reaches a reference level, the detector circuit counts a count value.

18 Claims, 6 Drawing Sheets

DETECTOR CIRCUIT HAVING CURRENT CONVERSION MECHANISM FOR POWER CONVERTER

CROSS-REFERENCE TO RELATED PATENT APPLICATION

This application claims the benefit of priority to Taiwan Patent Application No. 113104613, filed on Feb. 6, 2024. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a power converter, and more particularly to a detector circuit having a current conversion mechanism for a power converter.

BACKGROUND OF THE DISCLOSURE

Power converters are indispensable for electronic devices. The power converters are used to adjust power and supply the adjusted power to the electronic devices. A high-side switch and a low side switch of the power converter must be switched according to data such as voltages or currents of circuit components in the power converter such that the power converter supplies appropriate power to a load. However, a conventional controller circuit of the power converter cannot precisely detect a current flowing through an inductor connected to an output terminal of the power converter and thus cannot effectively control on-times and off-times of the high-side switch and the low side switch of the power converter, which results in a low operating efficiency of the power converter.

SUMMARY OF THE DISCLOSURE

In response to the above-referenced technical inadequacies, the present disclosure provides a detector circuit having a current conversion mechanism for a power converter. The power converter includes a high-side switch, a low-side switch and a driver circuit. The driver circuit is connected to a control terminal of the high-side switch and a control terminal of the low-side switch. A first terminal of the high-side switch is coupled with an input voltage. A second terminal of the high-side switch is connected to a first terminal of the low-side switch. A second terminal of the low-side switch is grounded. A node between the second terminal of the high-side switch and the first terminal of the low-side switch is connected to a first terminal of an inductor. A second terminal of the inductor is connected to a load. The detector circuit includes a current sensor circuit, a first resistor, a comparator, and a counter circuit. The current sensor circuit is connected to the first terminal of the inductor. The current sensor circuit is configured to sense a current flowing through the first terminal of the inductor as a detected current, or to amplify the current flowing through the first terminal of the inductor. A first terminal of the first resistor is connected to the current sensor circuit. A second terminal of the first resistor is grounded. The detected current or the current that is amplified flows through the first resistor. A first input terminal of the comparator is connected to the first terminal of the first resistor. A second input terminal of the comparator is coupled with a reference voltage. The comparator is configured to compare a voltage of the first terminal of the first resistor with the reference voltage to output a comparison signal. The counter circuit is connected to an output terminal of the comparator. The counter circuit is configured to count a count value each time when a level of the comparison signal reaches a reference level.

As described above, the present disclosure provides the detector circuit having the current conversion mechanism for the power converter. The detector circuit of the present disclosure precisely detects the current that flows through the inductor connected to the node between the second terminal of the high-side switch and the first terminal of the low-side switch, and converts the detected current to output the detected signal (that is the voltage signal). The detector circuit of the present disclosure may provide the detected signal to other circuits. For example, the detector circuit of the present disclosure may provide the detected signal to the compensation circuit of the power converter for compensating the error amplified signal outputted by the error amplifier of the power converter.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
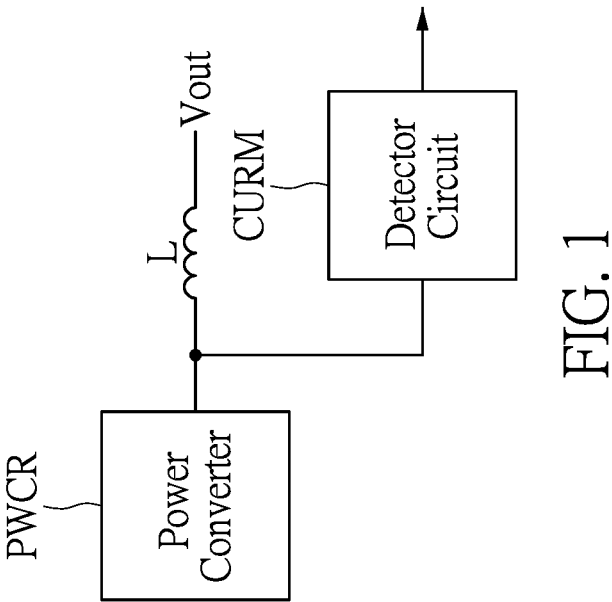
FIG. 1 is a block diagram of a detector circuit having a current conversion mechanism for a power converter according to first to fourth embodiments of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
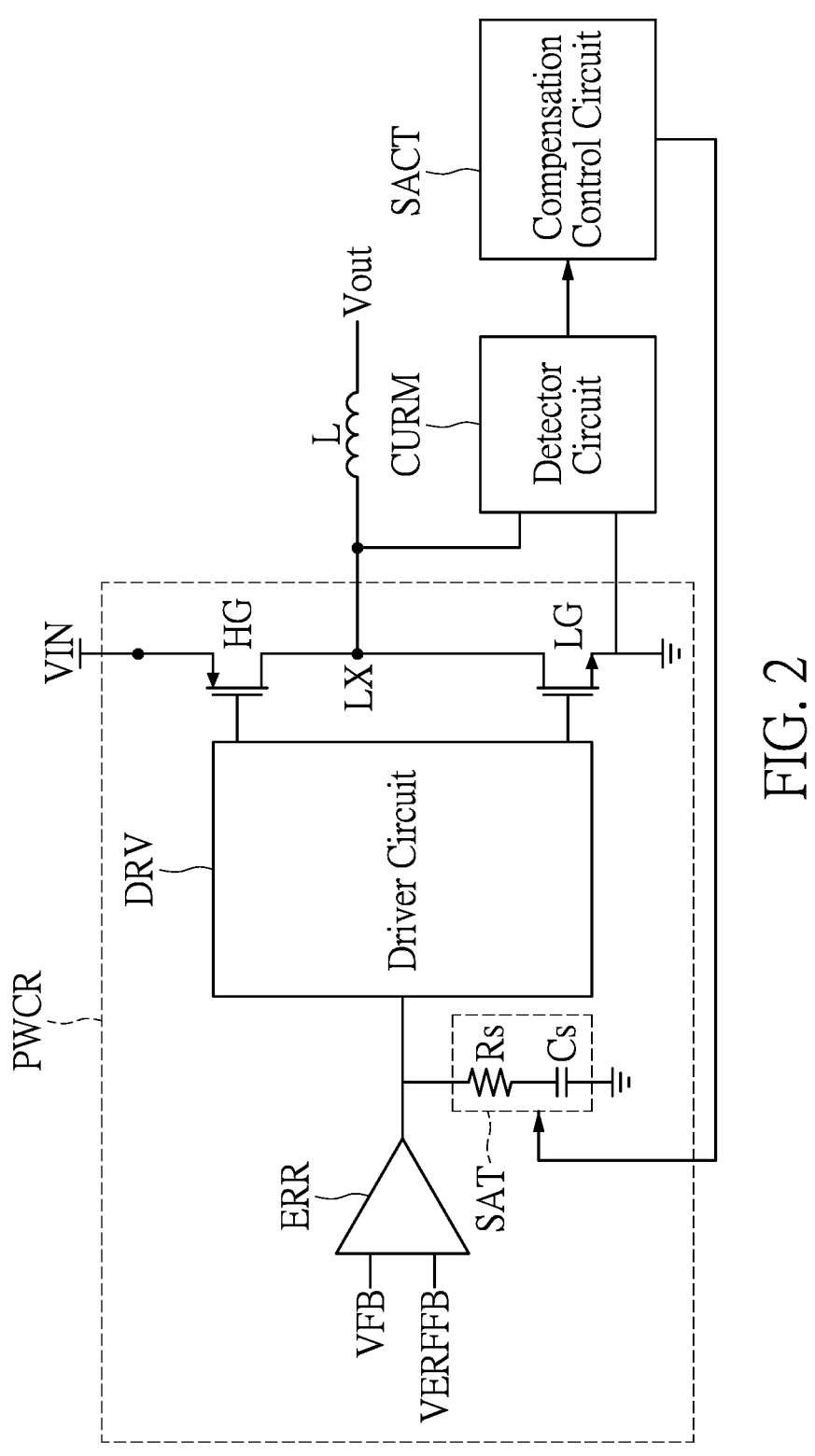
FIG. 2 is a circuit diagram of the detector circuit applied for compensation of signals of the power converter according to the first to fourth embodiments of the present disclosure.

Reference is made to FIG. 1 and FIG. 2, in which FIG. 1 is a block diagram of a detector circuit having a current conversion mechanism for a power converter according to first to fourth embodiments of the present disclosure, and FIG. 2 is a circuit diagram of the detector circuit applied for compensation of signals of the power converter according to the first to fourth embodiments of the present disclosure.

As shown in FIG. 1, a detector circuit CURM of the present disclosure is applicable to detect a current that flows from a power converter PWCR to an inductor L or a current that flows from the inductor L to the power converter PWCR. Then, the detector circuit CURM of the present disclosure converts the detected current into a voltage signal.

If necessary, as shown in FIG. 2, the detector circuit CURM of the present disclosure may output the voltage signal as a detected signal to a compensation control circuit SACT.

The compensation control circuit SACT may, according to the detected signal from the detector circuit CURM of the present disclosure, output a compensation control signal to one or more of a plurality of circuit components of the power converter PWCR. The one or more of the plurality of circuit components of the power converter PWCR, according to the compensation control signal, compensates signals outputted by others of the plurality of circuit components of the power converter PWCR.

In detail, the power converter PWCR detected by the detector circuit CURM of the present disclosure at least includes a high-side switch HG, a low-side switch LG and a driver circuit DRV. In practice, the power converter PWCR may further include other circuit components.

A first terminal of the high-side switch HG is coupled with an input voltage VIN. A second terminal of the high-side switch HS is connected to a first terminal of the low-side switch LG. A second terminal of the low-side switch LG is grounded. A node LX between the second terminal of the high-side switch HG and the first terminal of the low-side switch LG is connected to a first terminal of the inductor L. A second terminal of the inductor L is connected to a load. A voltage of the second terminal of the inductor L is an output voltage Vout as shown in FIG. 1.

The driver circuit DRV is connected to a control terminal of the high-side switch HG and a control terminal of the low-side switch LG. The driver circuit DRV drives the high-side switch HG and the low-side switch LG.

As shown in FIG. 2, the detector circuit CURM of the present disclosure is connected to the first terminal of the inductor L and the second terminal of the low-side switch LG. The detector circuit CURM of the present disclosure may detect a current that flows from the inductor L to the low-side switch LG inside the power converter PWCR or a current that flows from the low-side switch LG inside the power converter PWCR to the inductor L.

For example, as shown in FIG. 2, the power converter PWCR may further include an error amplifier ERR and a compensation circuit SAT. For example, the compensation circuit SAT may include a compensation resistor Rs and a compensation capacitor Cs, but the present disclosure is not limited thereto.

A first input terminal such as a non-inverting input terminal of the error amplifier ERR of the power converter PWCR is connected to the second terminal of the inductor L (through a voltage divider circuit). The first input terminal of the error amplifier ERR receives a voltage of the second terminal of the inductor L (or a voltage divided from the voltage of the second terminal of the inductor L by the voltage divider circuit) as a feedback voltage VFB. A second input terminal such as an inverting input terminal of the error amplifier ERR of the power converter PWCR may be coupled with a feedback reference voltage VERFFB.

The error amplifier ERR may multiply a difference between the feedback voltage VFB and the feedback reference voltage VERFFB by a gain to output an error amplified signal.

A resistance of the compensation resistor Rs of the compensation circuit SAT of the power converter PWCR, a capacitance of the compensation capacitor Cs of the compensation circuit SAT of the power converter PWCR or a combination thereof may be adjusted according to the compensation control signal from the compensation control circuit SACT.

The error amplified signal outputted by the error amplifier ERR of the power converter PWCR is transmitted to the compensation circuit SAT. The compensation circuit SAT compensates the error amplified signal and outputs the compensated error amplified signal to the driver circuit DRV. The driver circuit DRV may, according to the compensated error amplified signal, output a high-side driving signal to the control terminal of the high-side switch HG of the power converter PWCR, and output a low-side driving signal to the control terminal of the low-side switch LG of the power converter PWCR.

That is, the detector circuit CURM of the present disclosure detects the current flowing through the inductor L connected to an output terminal of the power converter PWCR and converts the detected current into the voltage signal. Signals of other circuit components of the power converter PWCR such as the error amplified signal of the error amplifier ERR may be compensated according to the voltage signal of the inductor L for adjusting operations of the high-side switch HG and the low-side switch LG of the power converter PWCR.

Figure 3:
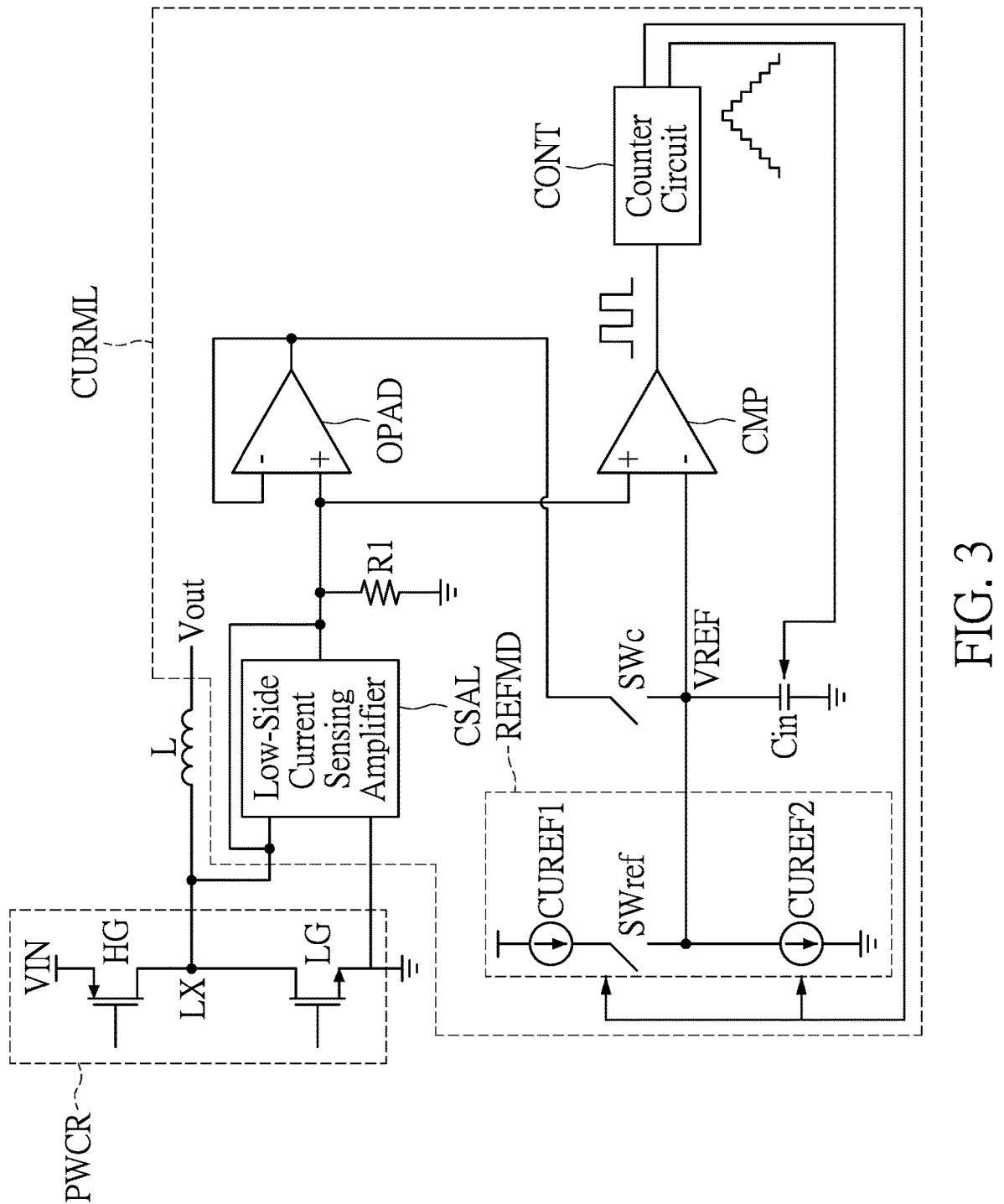
FIG. 3 is a circuit diagram of the detector circuit connected to a low-side switch of the power converter according to the first embodiment of the present disclosure.
Figure 4:
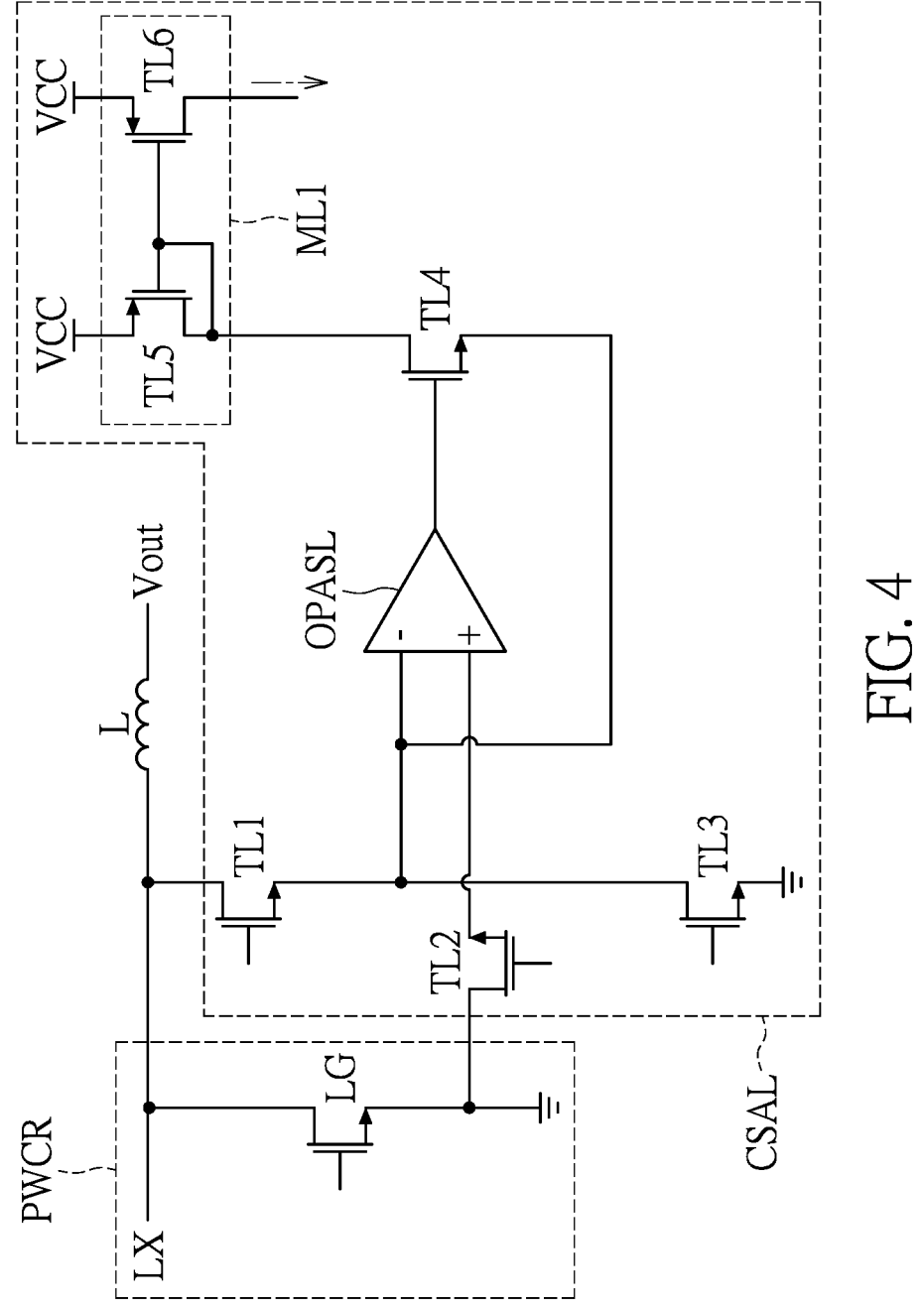
FIG. 4 is a circuit diagram of a low-side current sensing amplifier of the detector circuit according to the second embodiment of the present disclosure.

It is worth noting that, the detector circuit CURM of the present disclosure as shown in FIG. 1 and FIG. 2 may have the completely or partially same circuit component configurations as the detector circuit CURML as shown in FIG. 3, the detector circuit CURMH as shown in FIG. 4, or a combination thereof.

Reference is made to FIG. 3, which is a circuit diagram of the detector circuit connected to a low-side switch of the power converter according to the first embodiment of the present disclosure.

The detector circuit CURM of the present disclosure as shown in FIG. 1 and FIG. 2 may have the completely or partially same circuit component configurations as the detector circuit CURML as shown in FIG. 3. As shown in FIG. 3, the detector circuit CURML of the present disclosure is applicable to the power converter PWCR.

The detector circuit CURM of the present disclosure mainly includes a current sensor circuit, a first resistor R1, a comparator CMP and a counter circuit CONT. As shown in FIG. 3, the current sensor circuit of the detector circuit CURM of the present disclosure may include a low-side current sensing amplifier CSAL.

The low-side current sensing amplifier CSAL is a current sensing amplifier. A first input terminal of the low-side current sensing amplifier CSAL is connected to the first terminal of the inductor L (or the first terminal of the low-side switch LG). A second input terminal of the low-side current sensing amplifier CSAL is connected to the second terminal of the low-side switch LG of the power converter PWCR.

A first terminal of the first resistor R1 is connected to the first terminal of the inductor L and an output terminal of the low-side current sensing amplifier CSAL. A second terminal of the first resistor R1 is grounded.

The low-side current sensing amplifier CSAL may detect the current that flows from the inductor L to the low-side switch LG or the current that flows from the low-side switch LG to the inductor L as a detected current. Then, the low-side current sensing amplifier CSAL may directly output the detected current or multiply the detected current by a gain to output a low-side amplified sensing current.

The detected current or the low-side amplified sensing current flows through the first resistor R1 (or a resistor inside the comparator CMP in practice) from the low-side current sensing amplifier CSAL.

A first input terminal such as a non-inverting input terminal of the comparator CMP may be connected to the first terminal of the first resistor R1. A second input terminal such as an inverting input terminal of the comparator CMP may be coupled with a reference voltage VREF.

If necessary, the detector circuit CURM of the present disclosure may further include a reference current supply circuit REFMD and an input capacitor Cin for supplying the reference voltage VREF to the comparator CMP.

The reference current supply circuit REFMD is connected to a first terminal of the input capacitor Cin. The first terminal of the input capacitor Cin is connected to the second input terminal such as the inverting input terminal of the comparator CMP.

The reference current supply circuit REFMD may supply a reference current to the input capacitor Cin for changing the input capacitor Cin. A voltage of the input capacitor Cin is used as the reference voltage VREF and is inputted into the second input terminal such as the inverting input terminal of the comparator CMP.

For example, the reference current supply circuit REFMD may include a first reference current source CUREF1, a second reference current source CUREF2 and a reference power switching component SWref.

A first terminal of the first reference current source CUREF1 is connected to a first terminal of the reference power switching component SWref. A second terminal of the reference power switching component SWref is connected to a first terminal of the second reference current source CUREF2 and the first terminal of the input capacitor Cin. The first terminal of the input capacitor Cin is connected to the second input terminal such as the inverting input terminal of the comparator CMP. A second terminal of the input capacitor Cin is grounded.

The voltage of the first terminal of the first resistor R1 or the resistor inside the comparator CMP (through which the detected current or the low-side amplified sensing current flows from the low-side current sensing amplifier CSAL) is used as a detected voltage. The detected voltage is inputted to the first input terminal of the comparator CMP. The comparator CMP compares the detected voltage with the reference voltage VREF to output a comparison signal.

Each time when the detected voltage is higher than the reference voltage VREF, the comparison signal at a first level such as a high level may be outputted from an output terminal of the comparator CMP. Conversely, each time when the detected voltage is not higher than the reference voltage VREF, the comparison signal at a second level such as a low level may be outputted from the output terminal of the comparator CMP.

The counter circuit CONT is connected to the output terminal of the comparator CMP. Each time when a level of the comparison signal reaches a reference level such as the high level, the counter circuit CONT counts up a count value for increasing the count value once or counts down the count value for decreasing the count value once to output a count signal.

The count signal that is finally generated by the counter circuit CONT may have one or more waveforms. Rising and falling wave segments of the waveforms of the count signal may have a plurality of steps as shown in FIG. 3.

If the input capacitor Cin is a variable capacitor, the counter circuit CONT may output the count signal to a control terminal of the input capacitor Cin for controlling a capacitance of the input capacitor Cin to be changed with a change in the count value of the count signal, so as to adjust a slope of a voltage signal of the input capacitor Cin.

If the first reference current source CUREF1 is a variable source, the counter circuit CONT may output the count signal to a control terminal of the first reference current source CUREF1 for controlling a first current outputted by the first reference current source CUREF1 to be changed with the change in the count value of the count signal. CUREF1. If the second reference current source CUREF2 is a variable source, the counter circuit CONT may output the count signal to a control terminal of the second reference current source CUREF2 for controlling a second current outputted by the second reference current source CUREF2 to be changed with the change in the count value of the count signal.

If necessary, the detector circuit CURM of the present disclosure may further include a detection operational amplifier OPAD and a voltage switching component SWc.

The detection operational amplifier OPAD is an operational amplifier. A first input terminal such as a non-inverting input terminal of the detection operational amplifier OPAD is connected to the first input terminal such as the non-inverting input terminal of the comparator CMP.

A second input terminal such as an inverting input terminal of the detection operational amplifier OPAD is connected to a first terminal of the voltage switching component SWc and an output terminal of the detection operational amplifier OPAD. A second terminal of the voltage switching component SWc is connected to the second input terminal such as the inverting input terminal of the comparator CMP and the first terminal of the input capacitor Cin. The voltage switching component SWc is a switching component SWc.

After the low-side switch LG is turned on for a period of delay time, the second terminal of the voltage switching component SWc may be connected to the second input terminal such as the inverting input terminal of the comparator CMP. At this time, by the detection operational amplifier OPAD, a voltage of the second input terminal such as the inverting input terminal of the comparator CMP is pulled down to be equal to a voltage of the first input terminal such as the non-inverting input terminal of the comparator CMP.

Reference is made to FIG. 4, which is a circuit diagram of a low-side current sensing amplifier of the detector circuit according to the second embodiment of the present disclosure.

For example, the low-side current sensing amplifier CSAL as shown in FIG. 3 may include a first low-side sensing transistor TL1, a second low-side sensing transistor TL2, a third low-side sensing transistor TL3, a fourth low-side sensing transistor TL4, a low-side sensing current mirror ML1 and a low-side sensing operational amplifier OPASL as shown in FIG. 4.

The first low-side sensing transistor TL1, the second low-side sensing transistor TL2, the third low-side sensing transistor TL3 and the fourth low-side sensing transistor TL4 may be any appropriate types of transistors, and the present disclosure is not limited thereto.

As shown in FIG. 4, a first terminal of the first low-side sensing transistor TL1 is connected to the first terminal of the inductor L and the first terminal of the low-side switch LG. A control terminal of the first low-side sensing transistor TL1 is coupled with a first low-side sense driving voltage, or is connected to a sense driving circuit and receives a first low-side sense driving signal having the first low-side sense driving voltage from the sense driving circuit (not shown in figures).

The low-side sensing operational amplifier OPASL is an operational amplifier. A first input terminal such as an inverting input terminal of the low-side sensing operational amplifier OPASL is connected to a second terminal of the first low-side sensing transistor TL1.

A first terminal of the second low-side sensing transistor TL2 is connected to the second terminal of the low-side switch LG. A control terminal of the second low-side sensing transistor TL2 is coupled with a second low-side sense driving voltage, or is connected to the sense driving circuit and receives a second low-side sense driving signal having the second low-side sense driving voltage from the sense driving circuit (not shown in figures). A second terminal of the second low-side sensing transistor TL2 is connected to a second input terminal such as a non-inverting input terminal of the low-side sensing operational amplifier OPASL.

A first terminal of the third low-side sensing transistor TL3 is connected to the second terminal of the first low-side sensing transistor TL1 and the first input terminal such as the inverting input terminal of the low-side sensing operational amplifier OPASL. A control terminal of the third low-side sensing transistor TL3 is coupled with a third low-side sense driving voltage, or is connected to the sense driving circuit and receives a third low-side sense driving signal having the third low-side sense driving voltage from the sense driving circuit (not shown in figures). A second terminal of the third low-side sensing transistor TL3 is grounded.

A second terminal of the fourth low-side sensing transistor TL4 is connected to the first input terminal such as the inverting input terminal of the low-side sensing operational amplifier OPASL. A control terminal of the fourth low-side sensing transistor TL4 is connected to an output terminal of the low-side sensing operational amplifier OPASL.

The low-side sensing current mirror ML1 is a current mirror. The low-side sensing current mirror ML1 may include a fifth low-side sensing transistor TL5 and a sixth low-side sensing transistor TL6.

A first terminal of the fifth low-side sensing transistor TL5 is coupled with a common voltage VCC. A second terminal of the fifth low-side sensing transistor TL5 is used as an input terminal of the low-side sensing current mirror ML1, and is connected to a first terminal of the fourth low-side sensing transistor TL4 and a control terminal of the fifth low-side sensing transistor TL5.

A first terminal of the sixth low-side sensing transistor TL6 is coupled with the common voltage VCC. A control terminal of the sixth low-side sensing transistor TL6 is connected to the control terminal of the fifth low-side sensing transistor TL5.

A second terminal of the sixth low-side sensing transistor TL6 is used as an output terminal of the low-side sensing current mirror ML1, and is connected to the first terminal of the first resistor R1 and the first input terminal such as the non-inverting input terminal of the comparator CMP. A current flows from the second terminal of the sixth low-side sensing transistor TL6 to the first resistor R1 (or to the resistor inside the comparator CMP).

Figure 5:
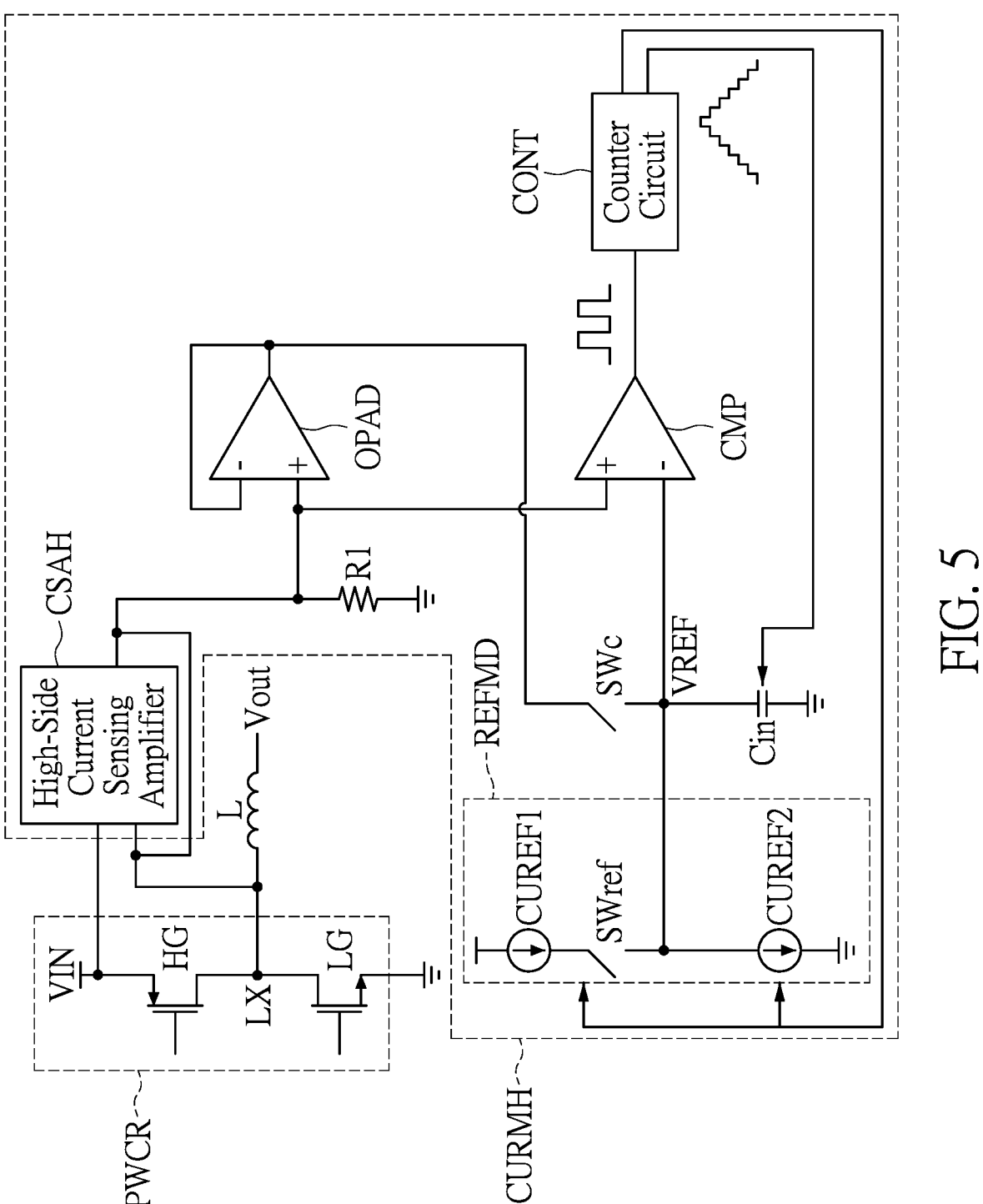
FIG. 5 is a circuit diagram of the detector circuit connected to a high-side switch of the power converter according to the third embodiment of the present disclosure.

Reference is made to FIG. 5, which is a circuit diagram of the detector circuit connected to a high-side switch of the power converter according to the third embodiment of the present disclosure.

The detector circuit CURM of the present disclosure shown in FIG. 1 and FIG. 2 may have the completely or partially same circuit component configurations as the detector circuit CURMH shown in FIG. 5. As shown in FIG. 5, the detector circuit CURMH of the present disclosure is applicable to the power converter PWCR.

The same descriptions of the detector circuit CURMH as shown in FIG. 5 that are the same as that of the detector circuit CURML as shown in FIG. 3 are not repeated herein.

A difference between the detector circuit CURMH as shown in FIG. 5 and the detector circuit CURML as shown in FIG. 3 is that, the current sensor circuit of the detector circuit CURML includes the low-side current sensing amplifier CSAL as shown in FIG. 3, but a current sensor circuit of the detector circuit CURMH includes a high-side current sensing amplifier CSAH as shown in FIG. 5.

In practice, the current sensor circuit of the detector circuit of the present disclosure may include both of the high-side current sensing amplifier CSAH and the low-side current sensing amplifier CSAL.

The high-side current sensing amplifier CSAH is a current sensing amplifier.

As shown in FIG. 5, the high-side current sensing amplifier CSAH is connected to the first terminal of the high-side switch HG of the power converter PWCR, and is connected to the second terminal of the high-side switch HG and the first terminal of the inductor L.

The high-side current sensing amplifier CSAH of the detector circuit CURMH of the present disclosure may be used to sense a current that flows from the high-side switch HG of the power converter PWCR to the inductor L as the detected current. Then, the high-side current sensing amplifier CSAH may directly output the detected current, or multiply the detected current by a gain to output a high-side amplified sensing current.

The detected current or the amplified high-side sensing current flows through the first resistor R1 (or the resistor inside the comparator CMP in practice) from the high-side current sensing amplifier CSAH.

The voltage of the first terminal of the first resistor R1 (through which the detected current or the high-side amplified sensing current flows from the high-side current sensing amplifier CSAH) is used as the detected voltage. The detected voltage is inputted to the first input terminal of the comparator CMP. The comparator CMP compares the detected voltage with the reference voltage VREF to output the comparison signal.

Each time when the level of the comparison signal reaches the reference level such as the high level, the counter circuit CONT counts the count value to output the count signal.

Figure 6:
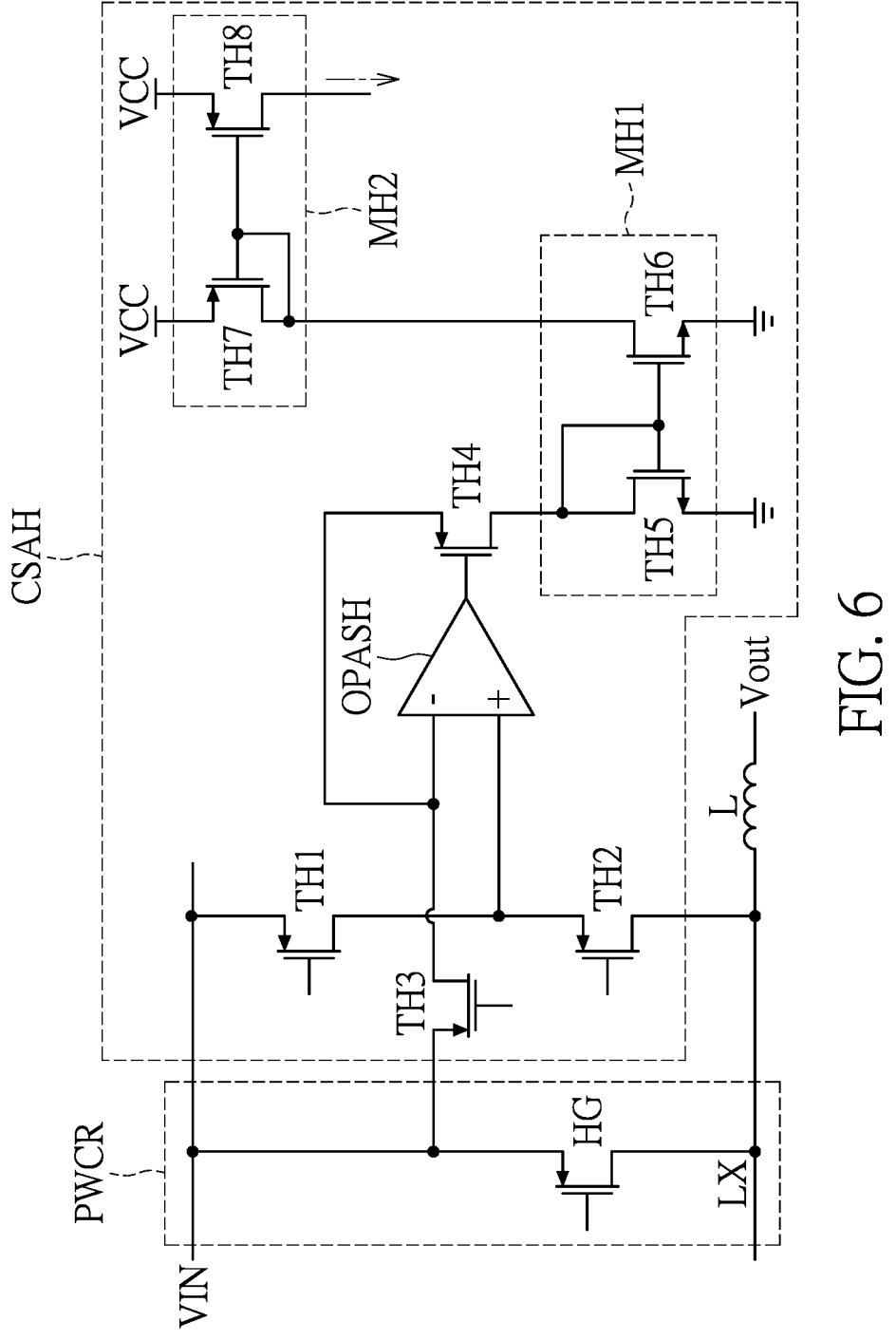
FIG. 6 is a circuit diagram of the detector circuit connected to a high-side current sensing amplifier of the power converter according to the fourth embodiment of the present disclosure.

Reference is made to FIG. 6, which is a circuit diagram of the detector circuit connected to a high-side current sensing amplifier of the power converter according to the fourth embodiment of the present disclosure.

For example, the high-side current sensing amplifier CSAH as shown in FIG. 3 may include a first high-side sensing transistor TH1, a second high-side sensing transistor TH2, a third high-side sensing transistor TH3, a fourth high-side sensing transistor TH4, a high-side sensing operational amplifier OPASH, a first high-side sensing current mirror MH1 and a second high-side sensing current mirror MH2 as shown in FIG. 5.

A first terminal of the first high-side sensing transistor TH1 is coupled with the input voltage VIN. A control terminal of the first high-side sensing transistor TH1 is coupled with a first high-side sense driving voltage, or is connected to the sense driving circuit and receives a first high-side sense driving signal having the first high-side sense driving voltage from the sense driving circuit (not shown in figures).

A first terminal of the second high-side sensing transistor TH2 is connected to a second terminal of the first high-side sensing transistor TH1. A second terminal of the second high-side sensing transistor TH2 is connected to the first terminal of the inductor L, and is connected to the node LX between the second terminal of the high-side switch HG and the first terminal of the low-side switch LG.

A control terminal of the second high-side sensing transistor TH2 is coupled with a second high-side sense driving voltage, or is connected to the sense driving circuit and receives a second high-side sense driving signal having the second high-side sense driving voltage from the sense driving circuit (not shown in figures).

A first terminal of the third high-side sensing transistor TH3 is connected to the first terminal of the high-side switch HG. A control terminal of the third high-side sensing transistor TH3 is coupled with a third high-side sense driving voltage, or is connected to the sense driving circuit and receives a third high-side sense driving signal having the third high-side sense driving voltage from the sense driving circuit (not shown in figures).

The high-side sensing operational amplifier OPASH is an operational amplifier. A first input terminal such as an inverting input terminal of the high-side sensing operational amplifier OPASH is connected to a second terminal of the third high-side sensing transistor TH3. A second input terminal such as a non-inverting input terminal of the high-side sensing operational amplifier OPASH is connected to the first terminal of the second high-side sensing transistor TH2.

A first terminal of the fourth high-side sensing transistor TH4 is connected to the first input terminal such as the inverting input terminal of the high-side sensing operational amplifier OPASH. A control terminal of the fourth high-side sensing transistor TH4 is connected to an output terminal of the high-side sensing operational amplifier OPASH. A second terminal of the fourth high-side sensing transistor TH4 is grounded.

The first high-side sensing current mirror MH1 is a current mirror. The first high-side sensing current includes a fifth high-side sensing transistor TH5 and a sixth high-side sensing transistor TH6. The second high-side sensing current mirror MH2 is a current mirror. The second high-side sensing current mirror MH2 includes a seventh high-side sensing transistor TH7 and an eighth high-side sensing transistor TH8.

The first high-side sensing transistor TH1, the second high-side sensing transistor TH2, the third high-side sensing transistor TH3, the fourth high-side sensing transistor TH4, the fifth high-side sensing transistor TH5, the sixth high-side sensing transistor TH6, the seventh high-side sensing transistor TH7 and the eighth high-side sensing transistor TH8 are any appropriate types of transistors, and present disclosure is not limited thereto.

A first terminal of the fifth high-side sensing transistor TH5 is used as an input terminal of the first high-side sensing current mirror MH1, and is connected to the second terminal of the fourth high-side sensing transistor TH4 and a control terminal of the fifth high-side sensing transistor TH5. A second terminal of the fifth high-side sensing transistor TH5 is grounded.

A control terminal of the sixth high-side sensing transistor TH6 is connected to the control terminal of the fifth high-side sensing transistor TH5. A second terminal of the sixth high-side sensing transistor TH6 is grounded.

A first terminal of the seventh high-side sensing transistor TH7 is coupled with the common voltage VCC. A second terminal of the seventh high-side sensing transistor TH7 is used as an input terminal of the second high-side sensing current mirror MH2, and is connected to a first terminal of the sixth high-side sensing transistor TH6 and a control terminal of the seventh high-side sensing transistor TH7.

A first terminal of the eighth high-side sensing transistor TH8 is connected to the common voltage VCC. A control terminal of the eighth high-side sensing transistor TH8 is connected to a control terminal of the seventh high-side sensing transistor TH7.

A second terminal of the eighth high-side sensing transistor TH8 is used as an output terminal of the high-side current sensing amplifier CSAH, and is connected to the first terminal of the first resistor R1 and the first input terminal such as the non-inverting input terminal of the comparator CMP. A current flows through the first resistor R1 (or the resistor inside the comparator CMP) from the second terminal of the eighth high-side sensing transistor TH8.

In conclusion, the present disclosure provides the detector circuit having the current conversion mechanism for the power converter. The detector circuit of the present disclosure precisely detects the current that flows through the inductor connected to the node between the second terminal of the high-side switch and the first terminal of the low-side switch, and converts the detected current to output the detected signal (that is the voltage signal). The detector circuit of the present disclosure may provide the detected signal to other circuits. For example, the detector circuit of the present disclosure may provide the detected signal to the compensation circuit of the power converter for compensating the error amplified signal outputted by the error amplifier of the power converter.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A detector circuit having a current conversion mechanism for a power converter, wherein the power converter includes a high-side switch, a low-side switch and a driver circuit, the driver circuit is connected to a control terminal of the high-side switch and a control terminal of the low-side switch, a first terminal of the high-side switch is coupled with an input voltage, a second terminal of the high-side switch is connected to a first terminal of the low-side switch, a second terminal of the low-side switch is grounded, a node between the second terminal of the high-side switch and the first terminal of the low-side switch is connected to a first terminal of an inductor, and a second terminal of the inductor is connected to a load, the detector circuit comprising:

a current sensor circuit connected to the first terminal of the inductor, and configured to sense a current flowing through the first terminal of the inductor as a detected current, or to amplify the current flowing through the first terminal of the inductor;

a first resistor, wherein a first terminal of the first resistor is connected to the current sensor circuit, a second terminal of the first resistor is grounded, and the detected current or the current that is amplified flows through the first resistor;

a comparator, wherein a first input terminal of the comparator is connected to the first terminal of the first resistor, a second input terminal of the comparator is coupled with a reference voltage, and the comparator is configured to compare a voltage of the first terminal of the first resistor with the reference voltage to output a comparison signal; and a counter circuit connected to an output terminal of the comparator and configured to count a count value each time when a level of the comparison signal reaches a reference level.

2. The detector circuit according to claim 1, wherein the current sensor circuit includes:

a low-side current sensing amplifier that is a current sensing amplifier, a first input terminal of the low-side current sensing amplifier is connected to the first terminal of the low-side switch, a second input terminal of the low-side current sensing amplifier is connected to the second terminal of the low-side switch, and an output terminal of the low-side current sensing amplifier is connected to the first input terminal of the comparator.

3. The detector circuit according to claim 2, wherein the low-side current sensing amplifier includes:

a first low-side sensing transistor, wherein a first terminal of the first low-side sensing transistor is connected to the first terminal of the inductor, and a control terminal of the first low-side sensing transistor is coupled with a first low-side sense driving voltage;

a low-side sensing operational amplifier that is an operational amplifier, wherein a first input terminal of the low-side sensing operational amplifier is connected to a second terminal of the first low-side sensing transistor;

a second low-side sensing transistor, wherein a first terminal of the second low-side sensing transistor is connected to the second terminal of the low-side switch, a control terminal of the second low-side sensing transistor is coupled with a second low-side sensing driving voltage, and a second terminal of the second low-side sensing transistor is connected to a second input terminal of the low-side sensing operational amplifier;

a third low-side sensing transistor, wherein a first terminal of the third low-side sensing transistor is connected to the second terminal of the first low-side sensing transistor and the first input terminal of the low-side sensing operational amplifier, a control terminal of the third low-side sensing transistor is coupled with a third low-side sense driving voltage, and a second terminal of the third low-side sensing transistor is grounded; and a fourth low-side sensing transistor, wherein a first terminal of the fourth low-side sensing transistor is coupled with a common voltage, a second terminal of the fourth low-side sensing transistor is connected to the first input terminal of the low-side current sensing amplifier, a control terminal of the fourth low-side sensing transistor is connected to an output terminal of the low-side current sensing amplifier, and a first terminal of the fourth low-side sensing transistor is used as an output terminal of the low-side current sensing amplifier.

4. The detector circuit according to claim 3, wherein the low-side current sensing amplifier further includes:

a low-side sensing current mirror, wherein an input terminal of the low-side sensing current mirror is connected to the first terminal of the fourth low-side sensing transistor, and an output terminal of the low-side sensing current mirror is used as the output terminal of the low-side current sensing amplifier.

5. The detector circuit according to claim 4, wherein the low-side sensing current mirror includes:

a fifth low-side sensing transistor, wherein an input terminal of the fifth low-side sensing transistor is coupled with the common voltage, a second terminal of the fifth low-side sensing transistor is used as the input terminal of the low-side sensing current mirror, and the second terminal of the fifth low-side sensing transistor is connected to the first terminal of the fourth low-side sensing transistor and a control terminal of the fifth low-side sensing transistor; and a sixth low-side sensing transistor, wherein an input terminal of the sixth low-side sensing transistor is coupled with the common voltage, a control terminal of the sixth low-side sensing transistor is connected to the control terminal of the fifth low-side sensing transistor, and a second terminal of the sixth low-side sensing transistor is used as the output terminal of the low-side current sensing amplifier.

6. The detector circuit according to claim 1, further comprising:

an input capacitor, wherein a first terminal of the input capacitor is connected to the second input terminal of the comparator, and a second terminal of the input capacitor is grounded; and a reference current supply circuit connected to the first terminal of the input capacitor and configured to supply a reference current to the input capacitor.

7. The detector circuit according to claim 6, wherein the reference current supply circuit is connected to the counter circuit, and configured to adjust the reference current according to the count value from the counter circuit.

8. The detector circuit according to claim 6, wherein the input capacitor is a variable capacitor, a control terminal of the input capacitor is connected to the counter circuit, and a capacitance of the input capacitor changes with a change of the count value from the counter circuit.

9. The detector circuit according to claim 6, further comprising:

a detection operational amplifier that is an operational amplifier, wherein a first input terminal of the detection operational amplifier is connected to the first input terminal of the comparator; and a voltage switching component, wherein a first terminal of the voltage switching component is connected to a second input terminal and an output terminal of the detection operational amplifier, and a second terminal of the detection operational amplifier is connected to the first terminal of the input capacitor.

10. The detector circuit according to claim 6, wherein the reference current supply circuit includes:

a first reference current source connected to the first terminal of the input capacitor.

11. The detector circuit according to claim 10, wherein the reference current supply circuit further includes:

a second reference current source, wherein a first terminal of the second reference current source is connected to the first terminal of the input capacitor, and a second terminal of the second reference current source is grounded.

12. The detector circuit according to claim 11, further comprising:

a reference power switching component, wherein a first terminal of the reference power switching component is connected to the first reference current source, and a second terminal of the reference power switching component is connected to the first terminal of the second reference current source and the second input terminal of the comparator.

13. The detector circuit according to claim 1, wherein the current sensor circuit includes:

a high-side current sensing amplifier that is a current sensing amplifier, wherein a first input terminal of the high-side current sensing amplifier is connected to the first terminal of the high-side switch, the second input terminal of the high-side current sensing amplifier is connected to the second terminal of the high-side switch, and an output terminal of the high-side current sensing amplifier is connected to the first input terminal of the comparator.

14. The detector circuit according to claim 13, wherein the high-side current sensing amplifier includes:

a first high-side sensing transistor, wherein a first terminal of the first high-side sensing transistor is coupled with the input voltage, and a control terminal of the first high-side sensing transistor is coupled with a first high-side sense driving voltage;

a second high-side sensing transistor, wherein a first terminal of the second high-side sensing transistor is connected to a second terminal of the first high-side sensing transistor, a second terminal of the second high-side sensing transistor is connected to the first terminal of the inductor, and a control terminal of the second high-side sensing transistor is coupled with a second high-side sense driving voltage;

a third high-side sensing transistor, wherein a first terminal of the third high-side sensing transistor is connected to the first terminal of the high-side switch, and a control terminal of the third high-side sensing transistor is coupled with a third high-side sense driving voltage;

a high-side sensing operational amplifier that is an operational amplifier, wherein a first input terminal of the high-side sensing operational amplifier is connected to a second terminal of the third high-side sensing transistor, and a second input terminal of the high-side sensing operational amplifier is connected to the first terminal of the second high-side sensing transistor; and a fourth high-side sensing transistor, wherein a first terminal of the fourth high-side sensing transistor is connected to the first input terminal of the high-side sensing operational amplifier, a control terminal of the fourth high-side sensing transistor is connected to an output terminal of the high-side sensing operational amplifier, a second terminal of the fourth high-side sensing transistor is grounded, and a first terminal of the fourth high-side sensing transistor is used as the output terminal of the high-side current sensing amplifier.

15. The detector circuit according to claim 14, wherein the high-side current sensing amplifier further includes:

a first high-side sensing current mirror, wherein an input terminal of the first high-side sensing current mirror is connected to the second terminal of the fourth high-side sensing transistor, and an output terminal of the first high-side sensing current mirror is used as the output terminal of the high-side current sensing amplifier.

16. The detector circuit according to claim 15, wherein the high-side current sensing amplifier further includes:

a second high-side sensing current mirror, wherein an input terminal of the second high-side sensing current mirror is connected to the output terminal of the first high-side sensing current mirror, and an output terminal of the second high-side sensing current mirror is used as the output terminal of the high-side current sensing amplifier.

17. The detector circuit according to claim 16, wherein the first high-side sensing current mirror includes:

a fifth high-side sensing transistor, wherein a first terminal of the fifth high-side sensing transistor is connected to the second terminal of the fourth high-side sensing transistor and a control terminal of the fifth high-side sensing transistor, and a second terminal of the fifth high-side sensing transistor is grounded; and a sixth high-side sensing transistor, wherein a control terminal of the sixth high-side sensing transistor is connected to the control terminal of the fifth high-side sensing transistor, a first terminal of the sixth high-side sensing transistor is connected to the input terminal of the second high-side sensing current mirror, and a second terminal of the sixth high-side sensing transistor is grounded.

18. The detector circuit according to claim 17, wherein the second high-side sensing current mirror includes:

a seventh high-side sensing transistor, wherein a first terminal of the seventh high-side sensing transistor is coupled with a common voltage, and a second terminal of the seventh high-side sensing transistor is connected to the first terminal of the sixth high-side sensing transistor and a control terminal of the seventh high-side sensing transistor; and an eighth high-side sensing transistor, wherein a first terminal of the eighth high-side sensing transistor is coupled with the common voltage, a control terminal of the eighth high-side sensing transistor is connected to the control terminal of the seventh high-side sensing transistor, and a second terminal of the eighth high-side sensing transistor is used as the output terminal of the high-side current sensing amplifier.

* * * * *